J. P. SMITH.
FOLDING CRATE.
APPLICATION FILED JUNE 11, 1910.

1,042,164.

Patented Oct. 22, 1912.
2 SHEETS—SHEET 2.

Witnesses
William Smith
C. Bradway

Inventor
John P. Smith.
By Victor J. Evans
Attorney

UNITED STATES PATENT OFFICE.

JOHN P. SMITH, OF SEGUIN, TEXAS.

FOLDING CRATE.

1,042,164. Specification of Letters Patent. Patented Oct. 22, 1912.

Application filed June 11, 1910. Serial No. 566,322.

*To all whom it may concern:*

Be it known that I, JOHN P. SMITH, a citizen of the United States, residing at Seguin, in the county of Guadalupe and State of Texas, have invented new and useful Improvements in Folding Crates, of which the following is a specification.

This invention relates to a poultry, fruit or vegetable crate of that type which can be knocked down when it is to be returned empty from the market so that it can be used over again indefinitely.

The invention has for one of its objects to provide a comparatively simple, inexpensive and practical crate of this character which consists of novelly arranged parts so designed that the side walls of the crate can fold inwardly over the bottom thereof when the top is removed, the top being then clamped in position to lock the parts firmly together.

Another object of the invention is the provision of a novel door construction for the crate for facilitating the insertion and removal of poultry or other articles.

Figure 1:
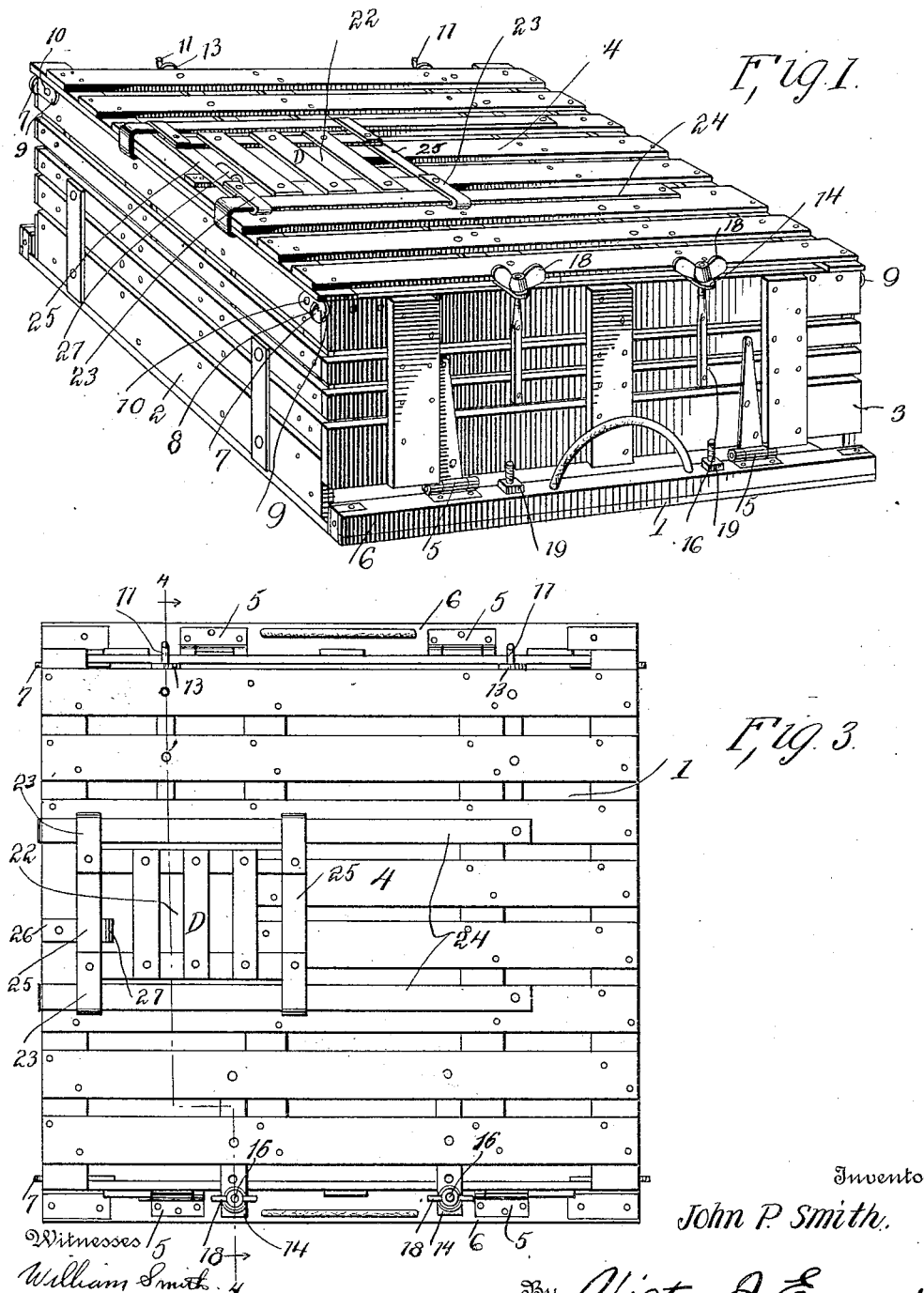
Figure 2:
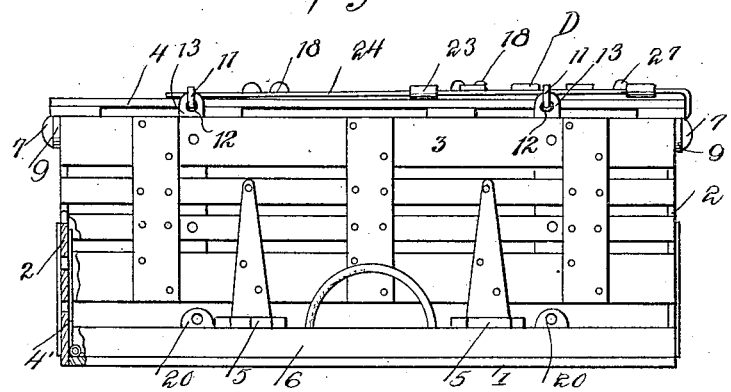
Figure 4:
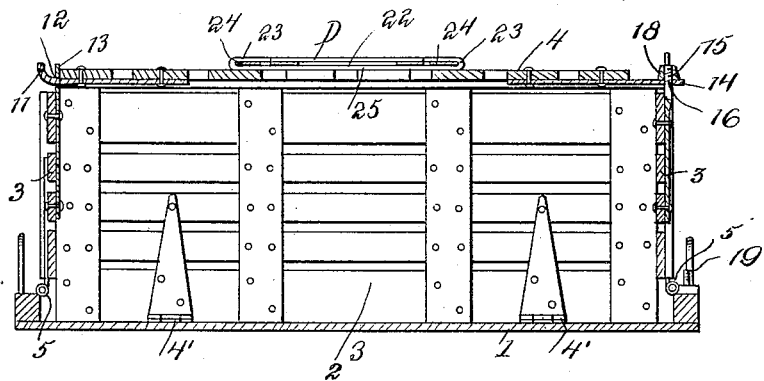
Figure 5:
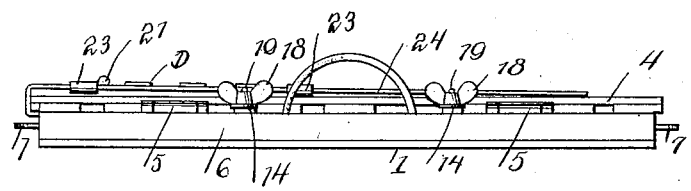

In the accompanying drawings, which illustrate one embodiment of the invention, Figure 1 is a perspective view of the crate. Fig. 2 is an end view thereof. Fig. 3 is a plan view. Fig. 4 is a transverse section taken on line 4—4, Fig. 3. Fig. 5 is an end view of the crate knocked down or collapsed.

Similar reference characters are employed to designate corresponding parts throughout the views.

Referring to the drawings, 1 designates the bottom of the crate, which may be made solid, if desired, and fastened to this bottom are side walls 2 and end walls 3, and removably supported on these walls is a top or cover 4 which, like the walls of the crate, may be made of slats, wire or the like. The side walls 2 are connected with the bottom by hinges 4' so arranged that the side walls will fold inwardly flat against the top surface of the bottom of the crate, while the end walls are secured by hinges 5 to cleats or strips 6 fastened to the bottom at the ends of the crate, and by this means, the end walls of the crate will be disposed at a higher level and rest flat against the side walls when the crate is folded. On the end walls, at the upper corners thereof, are laterally-projecting lugs 7 which have notches or seats 8 for receiving catches 9 pivoted at 10 on the upper corners of the side walls so that the walls of the crate can be locked together in upstanding position, the side walls fitting between the ends of the end walls.

The top of the crate has projecting from one edge spaced hooks 11 which detachably engage in apertures 12 formed in straps 13 secured to and projecting upwardly above the top edge of the end wall, the said hooks forming hinge connections between the top and body of the crate so that the top can swing open and at the same time the hooks can be readily detached from the apertured members or straps 13. Projecting from the edge of the top, opposite from the hooks, are straps 14 that have apertures 15 for receiving threaded studs 16 fastened on the adjacent end wall of the crate, and on these studs are thumb nuts 18 for clamping the cover or top of the crate securely closed. When the crate is folded, the apertured straps or members on the top will fit over the ends of the bolts 19 that pass through the cleats 6 of the bottom, and the thumb nuts can be screwed on these bolts so as to hold the top of the crate in place when folded, and the hook-shaped hinge members at the opposite edge of the top will engage in apertured lugs 20 secured to the inner face of and projecting above the cleats 6 at one end of the crate.

The top of the crate has an opening 22 that is normally closed by a door D. This door may be made of galvanized strip iron and at the corners thereof are guide eyes or loops 23 that extend around guides 24 fastened to the top 4 of the crate, said guides being strips of metal extending parallel to each other. The loops or eyes 22 are formed by bending the extremities of the end strips 25 of the door backwardly over and around the guides. The door is held in closed position by a catch 26 formed of a leaf spring having a shoulder or abutment 27 that engages behind the outer strip of which the door is made. This spring catch yields downwardly to permit the door to open or close.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired, as are within the scope of the claim appended hereto.

Having thus described the invention, what I claim is:—

A folding crate comprising a bottom member, side and end members, a cover removably supported by said side and end members, spaced apertured straps secured to one of the said end members and projecting above the upper edge thereof, rods secured to the other end member and having threaded upper ends disposed above the upper edge thereof, spaced laterally projecting hook members carried by the said cover at one side thereof and adapted to engage said straps to form a hinged connection between said cover and end member, spaced laterally projecting apertured lugs secured to the cover at the opposite side thereof and adapted to receive the upper ends of said rods, and nuts threaded on said rods above said lugs substantially as and for the purpose set forth.

In testimony whereof I affix my signature in presence of two witnesses.

JOHN P. SMITH.

Witnesses:
B. H. PULS,
HILMAR H. WEINERT.

---

Copies of this patent may be obtained for five cents each, by addressing the "Commissioner of Patents, Washington, D. C."